United States Patent [19]
de Haan et al.

[11] Patent Number: 5,212,548
[45] Date of Patent: May 18, 1993

[54] APPARATUS FOR MOTION VECTOR ESTIMATION WITH ASYMMETRIC UPDATE REGION

[75] Inventors: Gerard de Haan; Hendrik Huijgen, both of Eindhoven, Netherlands

[73] Assignee: U.S. Philips Corporation, New York, N.Y.

[21] Appl. No.: 751,289

[22] Filed: Aug. 29, 1991

[30] Foreign Application Priority Data

Sep. 3, 1990 [EP] European Pat. Off. ........ 90202328.2

[51] Int. Cl.⁵ .............................................. H04N 7/18
[52] U.S. Cl. ..................................... 358/105; 358/140
[58] Field of Search ....................... 358/105, 140, 136

[56] References Cited

U.S. PATENT DOCUMENTS

| | | | |
|---|---|---|---|
| 4,800,425 | 1/1989 | Schwerzel et al. | 358/105 X |
| 5,105,271 | 4/1992 | Niihara | 358/105 X |
| 5,111,511 | 5/1992 | Ishii et al. | 358/105 X |

OTHER PUBLICATIONS

G. de Haan et al., "New Algorithm For Motion Estimation", Proceedings of the Third International Workshop on HDTV, Torino, 1989.

Primary Examiner—Victor R. Kostak
Attorney, Agent, or Firm—Michael E. Marion

[57] ABSTRACT

In a motion estimator which adds small increments (P-2, P-4) to a prediction vector (P) to obtain a number of candidate vectors (2,4) from which an output vector is selected, a first increment (P-2) in a first direction has a different magnitude from a second increment (P-4) in a second direction.

17 Claims, 2 Drawing Sheets

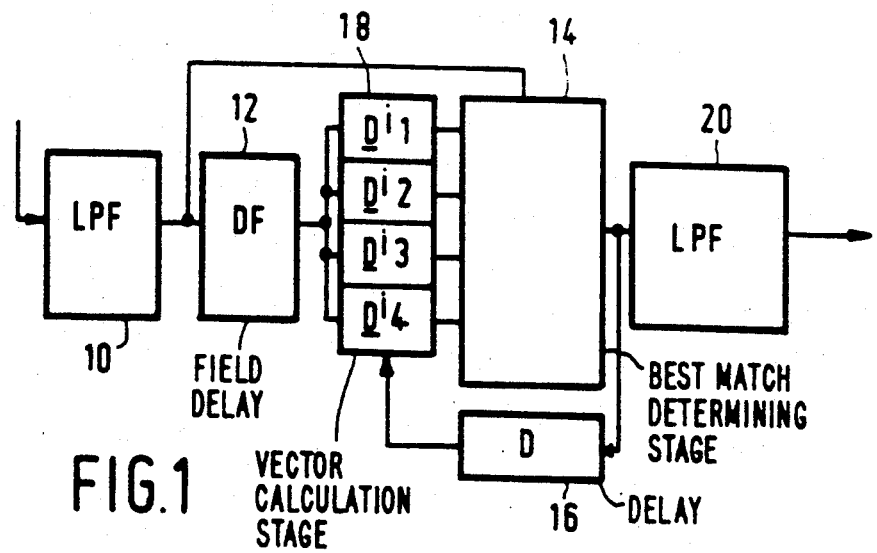
FIG.1
FIG.2
FIG.3
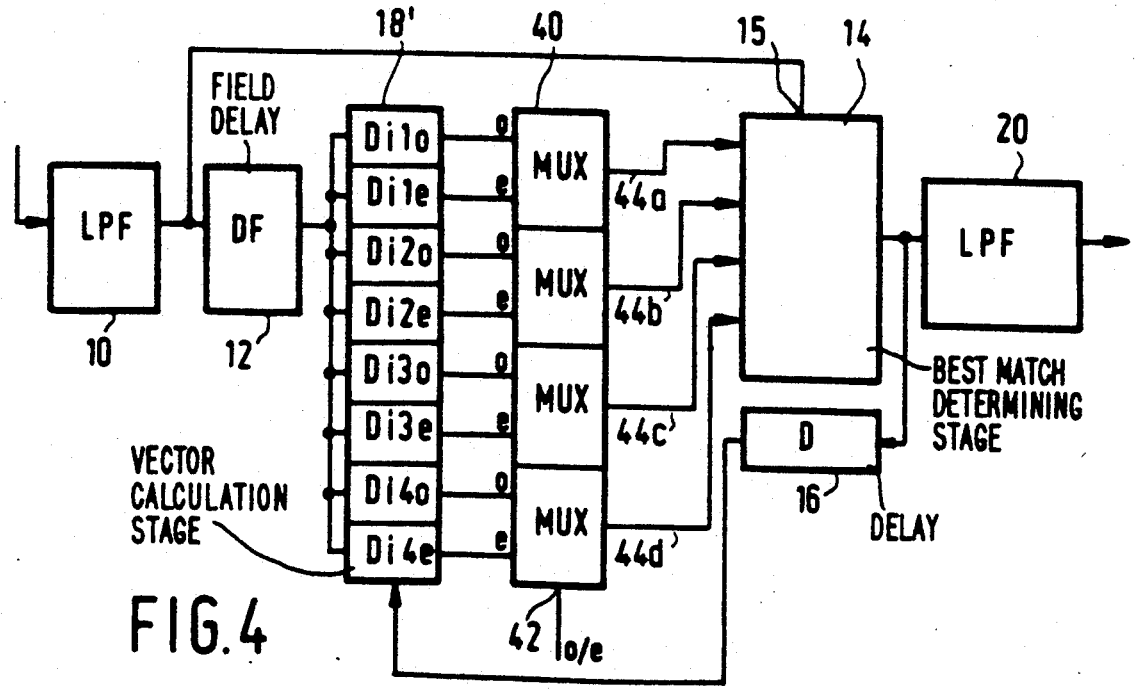
FIG.4

APPARATUS FOR MOTION VECTOR ESTIMATION WITH ASYMMETRIC UPDATE REGION

BACKGROUND OF THE INVENTION

The present invention relates to motion vector estimation in video images. Particularly, but not exclusively, it relates to motion vector estimation for standard conversion.

Motion vectors are used, for example, to estimate the position a (generally very small) part of the video image would occupy in a field to be interpolated between two input fields. The process may take place at the transmitting and/or at the receiving end and the part of the picture, herein referred to as a block, may be as small as a single pixel or may comprise a plurality of pixels adjacent to one another. In general, for a given block, a prediction vector, for example the motion vector from a previous block, is provided and a search is made around the predicted area in the second field to find the best match of pixel values over a block in the second field with that of the block on the first field. Such a system, with component based recursion is described in the article "New Algorithm for Motion Estimation" by Gerard de Haan and Henk Huijgen, Proceedings of the Third International Workshop on HDTV, Torino, 1989 sponsored by the IEEE, SMPTE et al. The article also includes a two-directional convergence scheme. The contents of the article will be reviewed in greater detail below, but the system it proposes has a limited search area and yields a stable estimate, but the convergence speed can be improved.

SUMMARY OF THE INVENTION

It is inter alia an object of the present invention to maintain the stability of the known system, but increase its speed of convergence.

One aspect of the present invention provides an apparatus which matches pixel values of blocks in a given field to pixel values in blocks of a adjacent field shifted relative to corresponding blocks in the given field by x and y values constituting components of an output motion vector. The apparatus comprises a delay furnishing a delayed output motion vector constituting a prediction vector, a candidate motion vector generator connected to the delay for adding small increments to the prediction motion vector thereby generating at least a first and second candidate motion vector, and selection circuits for selecting said output motion vector from said candidate motion vectors. It is characterized in that said candidate motion vector generator adds a first increment to said prediction motion vector in a first selected direction and a second increment, having a different value from said first increment, in a second selected direction.

Due to this measure, the advantages of a large update length, namely a fast convergence to the right value, and a short update length, namely an accurate and stable result, are combined in one estimator without increasing the number of operations per pixel. Advantageous embodiments are recited in the subclaims.

These and other aspects of the invention will be apparent from and elucidated with reference to the embodiments described hereinafter.

BRIEF DESCRIPTION OF THE DRAWINGS

In the drawings:

FIG. 1 is a block diagram of a vector estimator;

FIG. 2 is a schematic representation of a known method of estimating along separate convergence directions;

FIG. 3 is a schematic representation of the asymmetric search areas according to the present invention;

FIG. 4 is a block diagram of the apparatus for carrying out the asymmetric search strategy of the present invention;

DETAILED DESCRIPTION OF PREFERRED EMBODIMENTS OF THE INVENTION

Figure 5:
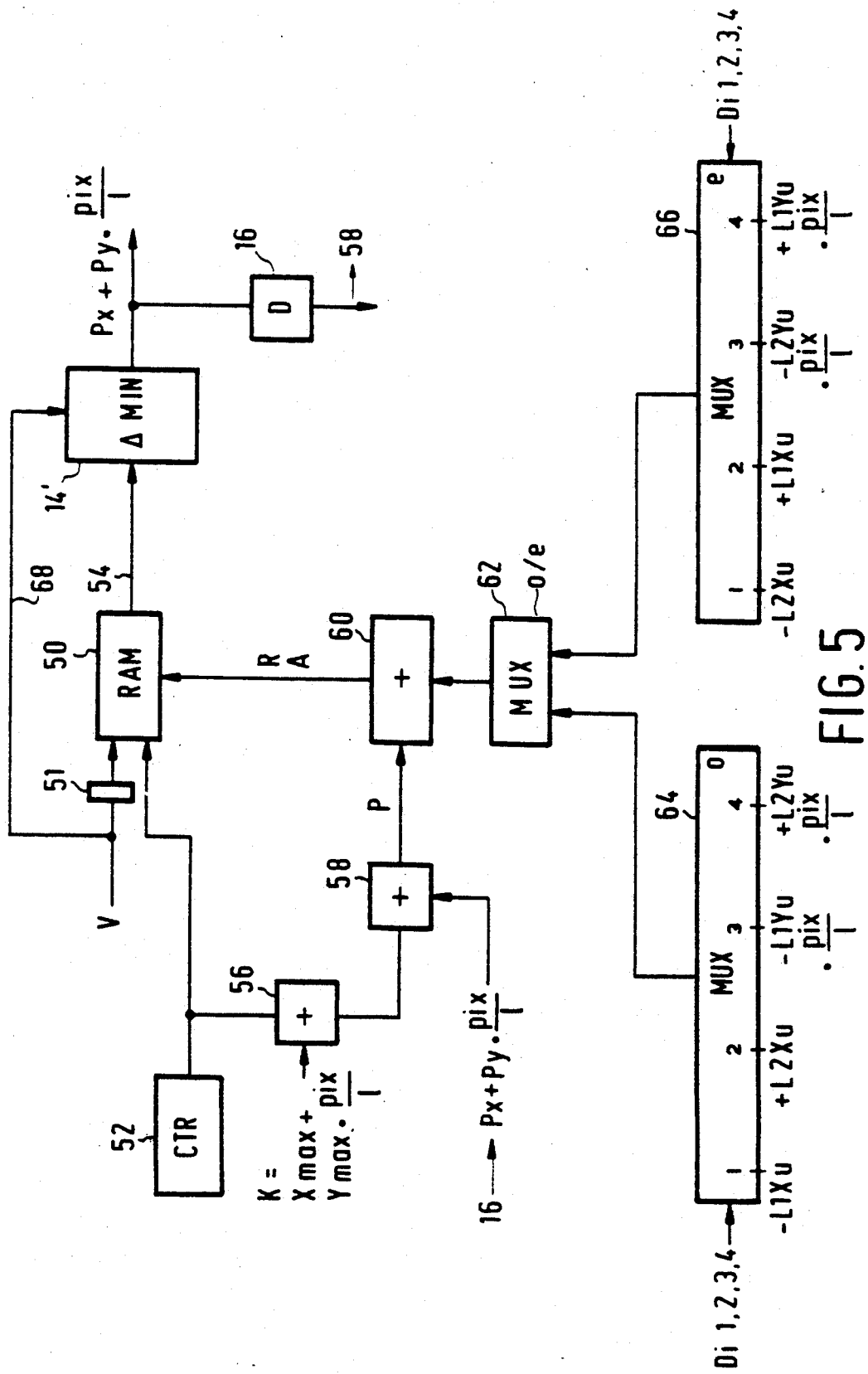
FIG. 5 is a more detailed block diagram of the apparatus of FIG. 4.

A basic block diagram of a motion vector estimator suitable to carry out the motion estimation method of the present invention and that of the above-identified article is illustrated in FIG. 1.

In FIG. 1 the interlaced input signal is filtered in a low-pass filter 10. The output of the low-pass filter is applied to a field delay 12 and a best match determining stage 14. The output of the stage 14 is the vector or vector component which yielded the best match of pixel values of blocks in the first and second fields. The best match can, for example, be the match causing the smallest mean absolute difference when comparing pixel values over the whole block, or the lowest means square error derived on a similar basis. As also indicated in FIG. 1, the vector or vector component which resulted in the best match is fed back through a delay 16 to constitute the prediction vector for the next block. In prior art circuitry, the search to determine the best match is carried out for four blocks located at equal distances in the plus x and minus x and the plus y and minus y directions from the predicted location. In other words, the candidate motion vectors Di are defined by the following table:

TABLE 1

| | |
|---|---|
| $Di_1 = Di-1 + L^* xu$, | Di-1 = prediction vector furnished by delay 16 |
| $Di_2 = Di-1 - L^* xu$, | xu = unit vector on x-axis |
| $Di_3 = Di-1 + L^* yu$, | yu = unit vector on y-axis |
| $Di_4 = Di-1 - L^* yu$ | L = update length (integer value) |

Error values are assigned to these candidate vectors using, for example, the Mean Absolute Difference (MAD)-criterion:

$$\text{error}(Di) = MAD = \Sigma x \, \Sigma y |sk(x) - sk-1(x-di)|$$

or the Mean Square Error (MSE)-criterion:

$$\text{error}(Di) = MSE - \Sigma x \, \Sigma y(sk(x) - sk-1(x-di))2$$

with
sk(x): signal value in present field at position x
sk−1(x): signal value in former field at position x x and y: horizontal and vertical block size respectively.

For each of the candidate vectors Di furnished by stage 18 thus e.g. the mean absolute difference or the mean square error is calculated between the pixel values of the block at a location corresponding to the location of the incoming data shifted in accordance with the candidate motion vector and to the pixel values of the incoming block. The calculation of the errors and determination of which of the calculated errors is the least takes place in stage 14.

The motion vectors which yield the minimum errors may be low-pass filtered in a stage 20.

It will be noted that the known system contemplated a symmetrical update in the plus and minus x- and y-directions.

In the article, use of separate convergence directions was also suggested. The convergence direction is herein defined as that direction in which a vector associated with the output of one block is used as the prediction vector for another block. Each block of pixels was subdivided into two subsampled blocks as illustrated in FIG. 2. The first subsampled block includes only the samples denoted by 1- and the second subsampled block includes only the samples denoted by 2-. The total number of operations per pixel thus remains unchanged, but the convergence direction differs for the two subsampled blocks. The result vector which yields the smallest block error is then assigned to the complete block. The use of two subsampled blocks implies that the circuitry of FIG. 1 is substantially doubled, one arrangement for the 1 samples and one arrangement for the 2 samples. In the following description this possible modification will be neglected.

In accordance with the principles of the present invention, in candidate vector calculation stage 18, the update length L of at least one candidate vector Di would be different from the update length of at least one other candidate vector.

In an embodiment of the present invention, two asymmetrical update sets are provided, preferably different for odd and even blocks along the conversion line. Preferably, the second update set is the mirror image of the first.

This may be expressed as follows:

TABLE 2

| | |
|---|---|
| Di1o = Di-1 + L1* xu, | |
| Di2o = Di-1 − L2* xu, | Di.o = candidate vector for odd blocks |
| Di3o = Di-1 + L1* yu, | Di.e = canditate vector for even blocks |
| Di4o = Di-1 − L2* yu | Di-1 = prediction vector furnished by delay 16 |
| | xu = unit vector on x-axis |
| Di1e = Di-1 + L2* xu, | yu = unit vector on y-axis |
| Di2e = Di-1 − L1* xu, | Ln = update length (integer value) |
| Di3e = Di-1 + L2* yu, | |
| Di4e = Di-1 − L1* yu. | |

For example, L1 may be small (e.g. 1) and L2 large (e.g. 3).

The resultant search areas for the given values are shown in FIG. 3, the search area for the odd numbered blocks being denoted by A, that for the even numbered blocks by B. The above table gives a presently preferred embodiment. However, the unit vectors xu and yu need not necessarily be at right angles to each other, nor need the candidate vectors with the L2 factor be at 180° to the candidate vectors with the L1 factor.

In addition, the update lengths in the x- and y-directions could be unequal. The search strategies illustrated in FIG. 3 would still apply, assuming different unit vectors were used in the x- and y-directions, respectively. For example, a unit vector could be one pixel distance in the x-direction and 2 pixels in the y-direction.

A schematic diagram of a motion vector estimator according to the present invention is illustrated in FIG. 4. The same low-pass filter 10 and the field delay 12 as were used in FIG. 1, may be used here. However, block 18' which corresponds to block 18 of FIG. 4 comprises, instead of four blocks Di1, Di2, Di3 and Di4 eight blocks, namely a different delay for odd and even blocks, respectively, for each of the blocks in FIG. 1.

As will be shown in greater detail with reference to FIG. 5, for odd-numbered blocks the pixel values derived from the search pattern pictured in FIG. 3A will appear at the lines indicated by "o" at the outputs of block 18' in FIG. 4. These lines are applied to a multiplexer 40 which, for the odd blocks, selects its "o" inputs and which, for the even blocks, selects its "e" under control of a signal applied at at terminal 42. These signals at the "o" output of blocks 18' thus appear on lines 44a–44d and are, in turn, compared to the present value of the signal applied to the best match block 14 at a terminal 15. As was the case with the prior art, the absolute differences between the pixel values applied via lines 44a–44d and the pixel values applied at terminal 15 is determined, the direction which yielded the pixel value with the smallest difference being selected as the output vector and as the prediction vector for the next block. It should be noted that odd and even blocks, as denoted by the o and e in boxes 18', designate alternate blocks in the convergence direction.

One of the greatest problems in motion estimation is to obtain motion vectors which describe the actual movement of an object having a moving periodic structure, such as a moving grated door. If in the picture, the bars of the grated door are positioned, for example, 14 pixels one from the other, it will be clear that a motion vector of +6 pixels seems to be as good as a motion vector of −8 pixels. However, if these motion vectors are used to interpolate an intermediate picture between two existing pictures, it is important to have vectors which describe the true motion.

With the following embodiment of the present invention it is possible to improve the performance on periodic structures, in case the structure has a clear boundary. As the algorithm starts converging at the boundary of a moving (periodic) object, a motion estimation algorithm with an improved spatial consistency could guarantee that after convergence on this boundary no other vectors will be selected. This improved spatial consistency is achieved by applying "penalties" on the selection of the candidate vectors which depend on the update length. Such a penalty may consist in that to the match error of a candidate vector a certain amount is added by block 14. For example, the prediction vector itself receives no penalty on the match error, a small horizontal update with length 1 receives a penalty of 10 units, a large horizontal update with length 5 receives a penalty of 50 units, and a vertical update with length 2 receives a penalty of 20 units. If, as discussed in our European Patent Application EP-A 0,415,491 (PHN 13,068), a temporal candidate vector from the previous field is used also, such temporal candidate vector could receive a penalty of 10 units. These units are related to a match error which in a block of 16 pixels with an 8 bit luminance quantization, has a maximum value of 16×255=4080 units.

The embodiment just described can be refined further if the update lengths and/or the penalties are made dependent on the spatial frequencies, as Applicants have found that in (highly) detailed areas short updates are preferred. More specifically, horizontal gradients are used to control horizontal update lengths and/or the penalties thereon, and vertical gradients are used to control vertical update lengths and/or the penalties thereon so that in detailed areas, in order to be elected, a candidate vector with a large update length should have a match error which is much lower than a candidate vector with a short update length. Preferably, in order to determine the amount of detail, the absolute value of the difference between two neighboring pixels is determined once for each 8 pixels. The absolute difference thus obtained is then applied to a recursive filter to reduce noise and influence the behavior of the motion estimator only if the detailed area exceeds a certain minimum extent.

The operation within each of the boxes Di1o-Di4e is shown in more detail in FIG. 5. In FIG. 5, video information is entered into a RAM 50 through a FIFO 51, under control of write addresses generated by an address counter 52. FIFO 51 is inserted to minimize the size of RAM 50 and provides a delay of one field delay rounded to an integer number of lines, minus an offset value K discussed below. It is then necessary to generate the correct read address so that for each block of video information entered into RAM 50 the pixel values at the four corresponding search positions for the given block will appear at the output 54 of RAM 50. For this purpose, an adder 56 adds the offset value K which is equal to the sum of the maximum x-value of a motion vector, and the maximum y-value of a motion vector multiplied by the number pix/1 of pixels per line, selected to cover the minimum required offset between write and read addresses taking into consideration the maximum candidate motion vector values. If FIFO 51 is omitted, the offset value K should correspond to a field delay rounded to an integer number of lines. Algebraically added to the resulting sum are the x-components and the y-components of the prediction vector in an adder 58. At the output of adder 58 there appears the read address resulting from the prediction vector P. This value must now be augmented as illustrated in part A of FIG. 3 for the odd-numbered blocks and part B of FIG. 3 for the even-numbered blocks. Thus the output of adder stage 58 is applied to one input of an adder 60 whose other input receives the output of a multiplexer 62. Multiplexer 62 is switched for odd (o) and even (e) blocks. For the odd blocks multiplexer 62 applies output of a multiplexer 64 to the second input of adder 60. These outputs are the update length L1 times a negative unit vector in the x-direction, the update length L2 times a positive unit vector in the x-direction, the update length L1 times a negative unit vector in the y-direction and the update length L2 times a positive unit vector in the y-direction. It should be noted that the unit vector in the y-direction is equal to the number pix/1 of pixels per line.

For even blocks, the second input applied to adder 60 via multiplexers 62 and 66 is the update length L2 times the unit x-vector in the negative direction, the update length L1 times the unit vector in the x-direction, the update length L2 times the unit y-vector in the negative direction and the update length L1 times the unit vector in the y-direction.

The output of adder 60 will thus be the correct read address for RAM 50.

The values appearing as a result on line 54 will be compared with the present values on line 68 in stage 14', the minimum difference causing the vector which resulted in this minimum difference to be output to the further processing stage 20 as well as delay 16.

The above-described asymmetrical search method can be combined with the subsampling illustrated in FIG. 2. Specifically, for each subsampled block with a given direction of conversion, the asymmetric search scheme described above can be implemented.

The present invention has been described in a particular embodiment, where, for clarity, some stages have been shown individually which could readily be combined in a practical embodiment. One example are the adding stages 58 and 56. The various multiplexers can also be implemented in different ways. The important point of the present invention is that the search scheme is asymmetric, that is selected blocks, preferably odd blocks and even blocks, along the convergence line have a different search pattern, thereby combining the advantages of a stable but slowly converging system with one of rapid conversions.

Various embodiments of the present invention are therefore clearly possible and are intended to be encompassed in the following Claims.

We claim:

1. A block matching motion estimation apparatus for matching pixel values of blocks in a given field to pixel values in blocks of a previous field shifted relative to corresponding blocks in said given field by x and y values constituting components of an output motion vector, said apparatus comprising:
   a) a delay furnishing a delayed output motion vector constituting a prediction vector,
   b) a candidate motion vector generator connected to said delay for adding at least first and second increment vectors having mutually different directions to said prediction vector thereby generating at least first and second candidate motion vectors, and
   c) a selection circuits for selecting said output motion vector from said candidate motion vectors, wherein said first increment vector has a first vector length and said second increment vector has a second vector length different from said first vector length.

2. Motion estimation apparatus as claimed in claim 1, wherein said candidate motion vector generator further adds a third increment in a third selected direction and a fourth increment having a value different from said third increment in a fourth selected direction, thereby generating a third and fourth candidate motion vector.

3. Motion estimation apparatus as claimed in claim 2, wherein said first and third increments are equal.

4. Motion estimation apparatus as claimed in claim 2, wherein said second and fourth increments are equal.

5. Motion estimation apparatus as claimed in claim 1, wherein said candidate motion vector generator reverses the direction of said first and second increments for first selected ones of said blocks.

6. Motion estimation apparatus as claimed in claim 2, wherein said candidate motion vector generator reverses the direction of said third and fourth increments for second selected ones of said blocks.

7. Motion apparatus as claimed in claim 5, wherein said first and second selected ones of said blocks are alternate blocks in a convergence direction.

8. Motion estimation apparatus as claimed in claim 1, wherein said selection circuits include means for determining a match error for each of said candidate motion vectors, and means for selecting that candidate vector which has the lowest match error, wherein said determining means add penalties to said match errors in dependence upon length of said increments of said candidate motion vectors.

9. Motion estimation apparatus as claimed in claim 8, wherein said increment lengths and/or said penalties depend on the spatial contents of said given field.

10. Motion estimation apparatus as claimed in claim 3, wherein said second and fourth increments are equal.

11. Motion estimation apparatus as claimed in claim 2, wherein said candidate motion vector generator reverses the direction of said first and second increments for first selected ones of said blocks.

12. Motion estimation apparatus as claimed in claim 5, wherein said candidate motion vector generator reverses the direction of said third and fourth increments for second selected ones of said blocks.

13. Motion estimation apparatus as claimed in claim 11, wherein said candidate motion vector generator reverses the direction of said third and fourth increments for second selected ones of said blocks.

14. Motion apparatus as claimed in claim 11, wherein said first and second selected ones of said blocks are alternate blocks in a convergence direction.

15. Motion apparatus as claimed in claim 6, wherein said first and second selected ones of said blocks are alternate blocks in a convergence direction.

16. Motion apparatus as claimed in claim 12, wherein said first and second selected ones of said blocks are alternate blocks in a convergence direction.

17. Motion apparatus as claimed in claim 13, wherein said first and second selected ones of said blocks are alternate blocks in a convergence direction.

* * * * *